United States Patent
Rappolt et al.

(10) Patent No.: US 10,106,729 B2
(45) Date of Patent: Oct. 23, 2018

(54) RESIN COMPOSITION, COATED PARTICLES, INJECTION MATERIAL AND METHOD FOR INJECTING INJECTION MATERIAL INTO FRACTURE

(71) Applicants: DUREZ CORPORATION, Novi, MI (US); SUMITOMO BAKELITE CO., LTD., Tokyo (JP)

(72) Inventors: James J. Rappolt, Lockport, NY (US); Michael Santorelli, Lockport, NY (US); Motoko Mori, Tokyo (JP); Masakatsu Asami, Tokyo (JP)

(73) Assignees: DUREZ CORPORATION, Novi, MI (US); SUMITOMO BAKELITE CO., LTD., Tokyo (JP)

( * ) Notice: Subject to any disclaimer, the term of this patent is extended or adjusted under 35 U.S.C. 154(b) by 138 days.

(21) Appl. No.: 14/161,305

(22) Filed: Jan. 22, 2014

(65) Prior Publication Data
US 2015/0203744 A1     Jul. 23, 2015

(51) Int. Cl.
  *C09K 8/80*  (2006.01)
  *E21B 43/267*  (2006.01)
(52) U.S. Cl.
  CPC .................................. *C09K 8/805* (2013.01)
(58) Field of Classification Search
  None
  See application file for complete search history.

(56) References Cited

U.S. PATENT DOCUMENTS

| 3,935,339 A | 1/1976 | Cooke, Jr. |
| 4,336,842 A * | 6/1982 | Graham ................. C09K 8/56 166/276 |

(Continued)

FOREIGN PATENT DOCUMENTS

| CN | 101432132 A | 5/2009 |
| CN | 101563436 A | 10/2009 |

(Continued)

OTHER PUBLICATIONS

International of Search Report of PCT/JP2014/051156, dated Mar. 4, 2014.

(Continued)

*Primary Examiner* — Jeffrey D Washville
(74) *Attorney, Agent, or Firm* — Westerman, Hattori, Daniels & Adrian, LLP

(57) ABSTRACT

A resin composition is used for forming a surface layer coating at least a part of an outer surface of a particle. The particle is adapted to be packed into a fracture formed in a subterranean formation, and contains a thermosetting resin and a hydrophilic polymer. It is preferred that the resin composition further contains a surfactant. According to the present invention, it is possible to provide an effect of preventing pieces of core particles from being scattered due to the action of a thermo-setting resin and an effect of improving compatibility with respect to water (that is, fluid repellent with respect to hydrocarbon) due to the action of a hydrophilic polymer in a synergistic manner. This increases conductivity of packed spaces of a subterranean formation (that is, fractures of the subterranean formation) in which coated particles are packed.

13 Claims, 4 Drawing Sheets

(56) References Cited

U.S. PATENT DOCUMENTS

| | | | | |
|---|---|---|---|---|
| 4,553,596 A | * | 11/1985 | Graham | C09K 8/80 |
| | | | | 166/295 |
| 5,420,174 A | * | 5/1995 | Dewprashad | C09K 8/685 |
| | | | | 507/220 |
| 2008/0202750 A1 | * | 8/2008 | Rediger | C09K 8/805 |
| | | | | 166/280.2 |
| 2009/0238988 A1 | | 9/2009 | McDaniel et al. | |
| 2010/0197526 A1 | * | 8/2010 | Zhang | C09K 8/18 |
| | | | | 507/105 |
| 2013/0196884 A1 | * | 8/2013 | Kakadjian | C09K 8/68 |
| | | | | 507/203 |
| 2014/0060833 A1 | * | 3/2014 | Kuhlmann | C09K 8/62 |
| | | | | 166/280.2 |
| 2016/0032180 A1 | * | 2/2016 | Agrawal | A61K 33/34 |
| | | | | 507/219 |

FOREIGN PATENT DOCUMENTS

| | | |
|---|---|---|
| DE | 102010051817 A1 | 5/2012 |
| JP | 2007-532721 A | 11/2007 |
| WO | 2004/092254 A2 | 10/2004 |
| WO | 2005/100007 A2 | 10/2005 |
| WO | 2006/034298 A2 | 3/2006 |
| WO | 2008/088449 A2 | 7/2008 |
| WO | 2012/066125 A1 | 5/2012 |

OTHER PUBLICATIONS

Extended European Search Report dated Oct. 20, 2016, issued in counterpart European Application No. 14743977.2 (6 pages).

\* cited by examiner

RESIN COMPOSITION, COATED PARTICLES, INJECTION MATERIAL AND METHOD FOR INJECTING INJECTION MATERIAL INTO FRACTURE

BACKGROUND OF THE INVENTION

Field of the Invention

The present invention relates to a resin composition, coated particles, an injection material and a method for injecting an injection material into a fracture.

Description of the Prior Art

Recently, recovery of oily hydrocarbon or gaseous hydrocarbon (fluid) from a subterranean formation is positively carried out. In particular, a wellbore is formed so as to penetrate a subterranean formation containing hydrocarbon. The hydrocarbon contained in the subterranean formation can be recovered through the wellbore. In this case, the subterranean formation is required to have sufficient conductivity (fluid permeability) to allow the fluid to flow through the wellbore.

In order to ensure the conductivity of the subterranean formation, for example, hydraulic fracturing is carried out. In the hydraulic fracturing operations, a viscous liquid is first injected into the subterranean formation through the wellbore at a sufficient rate and pressure to form fractures (cracks) in the subterranean formation. After that, particles are packed into the formed fractures for the purpose of preventing the fractures from being closed (blocked).

As examples of such particles, Cooke, Jr. (U.S. Pat. No. 3,935,339 A) discloses coated particles obtained by coating core particles such as silica sand or glass beads with an epoxy resin or the like (see, column 3, lines 7 to 21). Further, Graham et al. (U.S. Pat. No. 4,336,842 A) discloses coated particles obtained by coating core particles such as silica sand with a phenol resin or the like (see, column 2, line 55 to column 3, line 52).

Since such core particles of the coated particles are coated with a resin material, even if the core particles are collapsed into pieces due to the earth stresses, it is possible to prevent the pieces thereof from being scattered (spread). This makes it possible to prevent spaces among the coated particles from being closed by the pieces of the core particles, to thereby maintain the conductivity of the subterranean formation. However, from the viewpoints of improvement of an amount of the hydrocarbon recovered from the subterranean formation, it is required to develop coated particles which can keep higher conductivity of the subterranean formation.

SUMMARY OF THE INVENTION

It is an object of the present invention to provide coated particles adapted to be packed into a fracture formed in a subterranean formation and capable of maintaining high conductivity thereof, a resin composition used for forming surface layers of the coated particles, an injection material containing the coated particles, and a method for injecting it into the fracture.

In order to achieve the object, the present invention includes the following features (1) to (32).

(1) A resin composition used for forming a surface layer coating at least a part of an outer surface of a particle, the particle adapted to be packed into a fracture formed in a subterranean formation, the resin composition comprising:
a thermosetting resin; and
a hydrophilic polymer.

(2) The resin composition according to the above feature (1), wherein a weight average molecular weight of the thermosetting resin is in the range of 200 to 20,000.

(3) The resin composition according to the above feature (1) or (2), wherein the thermosetting resin contains a phenol resin.

(4) The resin composition according to any one of the above features (1) to (3), wherein an amount of the thermosetting resin contained in the resin composition is in the range of 70 to 99 wt %.

(5) The resin composition according to any one of the above features (1) to (4), wherein a weight average molecular weight of the hydrophilic polymer is in the range of 100 to 8,000.

(6) The resin composition according to any one of the above features (1) to (5), wherein the hydrophilic polymer includes 1 to 20 of hydroxyl groups in one molecule thereof.

(7) The resin composition according to any one of the above features (1) to (6), wherein the hydrophilic polymer contains polyalkylene glycol.

(8) The resin composition according to any one of the above features (1) to (7), wherein an amount of the hydrophilic polymer contained in the resin composition is in the range of 0.001 to 15 wt %.

(9) The resin composition according to any one of the above features (1) to (8), further comprising a surfactant.

(10) The resin composition according to the above feature (9), wherein the surfactant contains a nonionic surfactant.

(11) The resin composition according to the above feature (10), wherein the nonionic surfactant contains at least one of a fluoro-type surfactant and an acetylene-type surfactant.

(12) The resin composition according to any one of the above features (9) to (11), wherein an amount of the surfactant contained in the resin composition is in the range of 0.001 to 10 wt %.

(13) Coated particles adapted to be packed into a fracture formed in a subterranean formation, each coated particle comprising:
a core particle having an outer surface; and
a surface layer coating at least a part of the outer surface of the core particle,
wherein the surface layer contains a thermosetting resin and a hydrophilic polymer.

(14) The coated particles according to the above feature (13), wherein an average thickness of the surface layer is in the range of 0.5 to 20 μm.

(15) The coated particles according to the above feature (13) or (14), wherein the surface layer coats 50 to 100% of the outer surface of the core particle.

(16) The coated particles according to any one of the above features (13) to (15), wherein the core particles contain at least one kind of sand particles and ceramics particles.

(17) The coated particles according to any one of the above features (13) to (16), wherein an average particle size of the core particles is in the range of 100 to 3,000 μm.

(18) The coated particles according to any one of the above features (13) to (17), wherein the thermosetting resin is a cured state or an uncured state.

(19) The coated particles according to any one of the above features (13) to (18), wherein the thermosetting resin contains a phenol resin.

(20) The coated particles according to any one of the above features (13) to (19), wherein an amount of the thermosetting resin contained in the surface layer is in the range of 70 to 99 wt %.

(21) The coated particles according to any one of the above features (13) to (20), wherein a weight average molecular weight of the hydrophilic polymer is in the range of 100 to 8,000.

(22) The coated particles according to any one of the above features (13) to (21), wherein the hydrophilic polymer includes 1 to 20 of hydroxyl groups in one molecule thereof.

(23) The coated particles according to any one of the above features (13) to (22), wherein the hydrophilic polymer contains polyalkylene glycol.

(24) The coated particles according to any one of the above features (13) to (23), wherein an amount of the hydrophilic polymer contained in the surface layer is in the range of 0.001 to 15 wt %.

(25) The coated particles according to any one of the above features (13) to (24), wherein the surface layer further contains a surfactant.

(26) The coated particles according to the above feature (25), wherein the surfactant contains a nonionic surfactant.

(27) The coated particles according to the above feature (26), wherein the nonionic surfactant contains at least one of a fluoro-type surfactant and an acetylene-type surfactant.

(28) The coated particles according to any one of the above features (25) to (27), wherein an amount of the surfactant contained in the surface layer is in the range of 0.001 to 10 wt %.

(29) An injection material adapted to be injected into a fracture formed in a subterranean formation, the injection material comprising:

the coated particles defined by any one of the above features (13) to (28); and a fluid into which the coated particles are dispersed, the fluid for transferring the coated particles to the fracture.

(30) The injection material according to the above feature (29), wherein the fluid contains at least one of a solvent, a viscosity modifier, a surfactant, a breaker, a viscosity stabilizer, a gelling agent and a stabilizer.

(31) The injection material according to the above feature (29) or (30), wherein an amount of the coated particles contained in the injection material is in the range of 1 to 99 wt %.

(32) A method for injecting the injection material defined by any one of the above features (29) to (31) into a fracture formed in a subterranean formation by transferring it to the fracture through a wellbore penetrating the subterranean formation.

Effects of the Invention

According to the present invention, it is possible to provide an effect of preventing pieces of core particles from being scattered due to the action of a thermosetting resin and an effect of improving compatibility with respect to water (that is, fluid repellent with respect to hydrocarbon) due to the action of a hydrophilic polymer in a synergistic manner. This makes it possible to increase conductivity of packed spaces of a subterranean formation (that is, fractures of the subterranean formation) in which the coated particles are packed.

DESCRIPTION OF THE PREFERRED EMBODIMENTS

Hereinafter, preferred embodiments of a resin composition, coated particles, an injection material and a method for injecting an injection material into a fracture according to the present invention will be described in detail with reference to the accompanying drawings.

Figure 1:
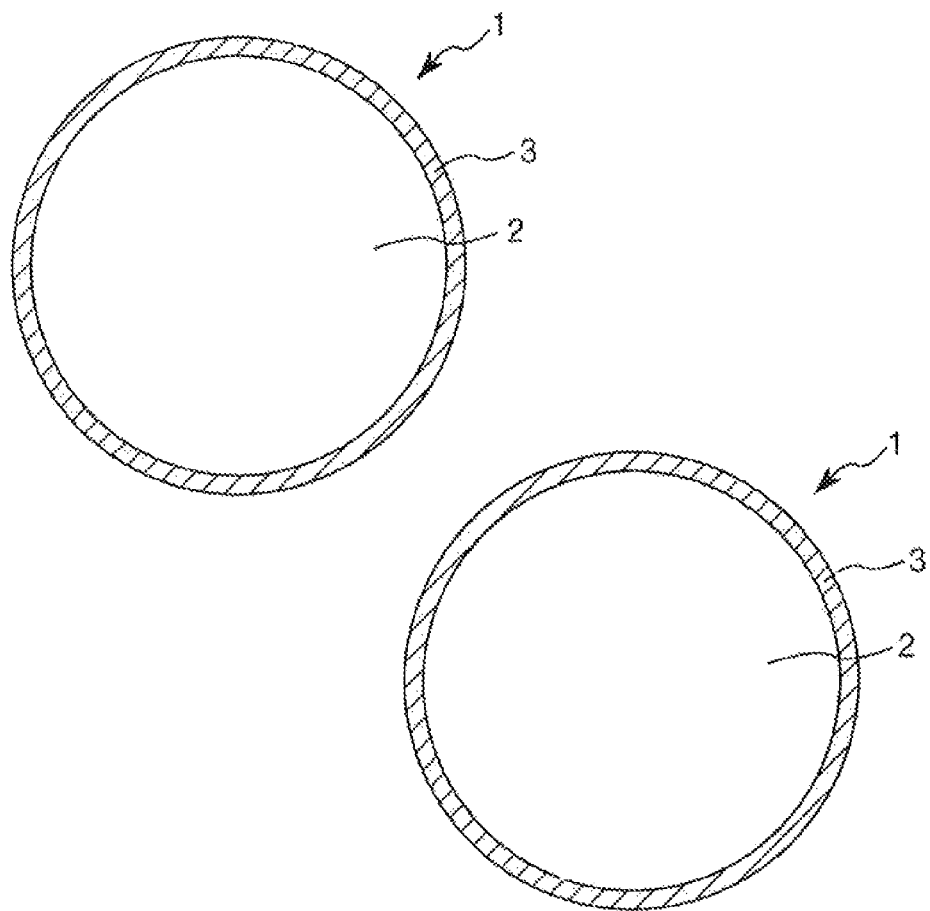
FIG. 1 is a partial cross-sectional view showing an embodiment of coated particles according to the present invention.
Figure 2:
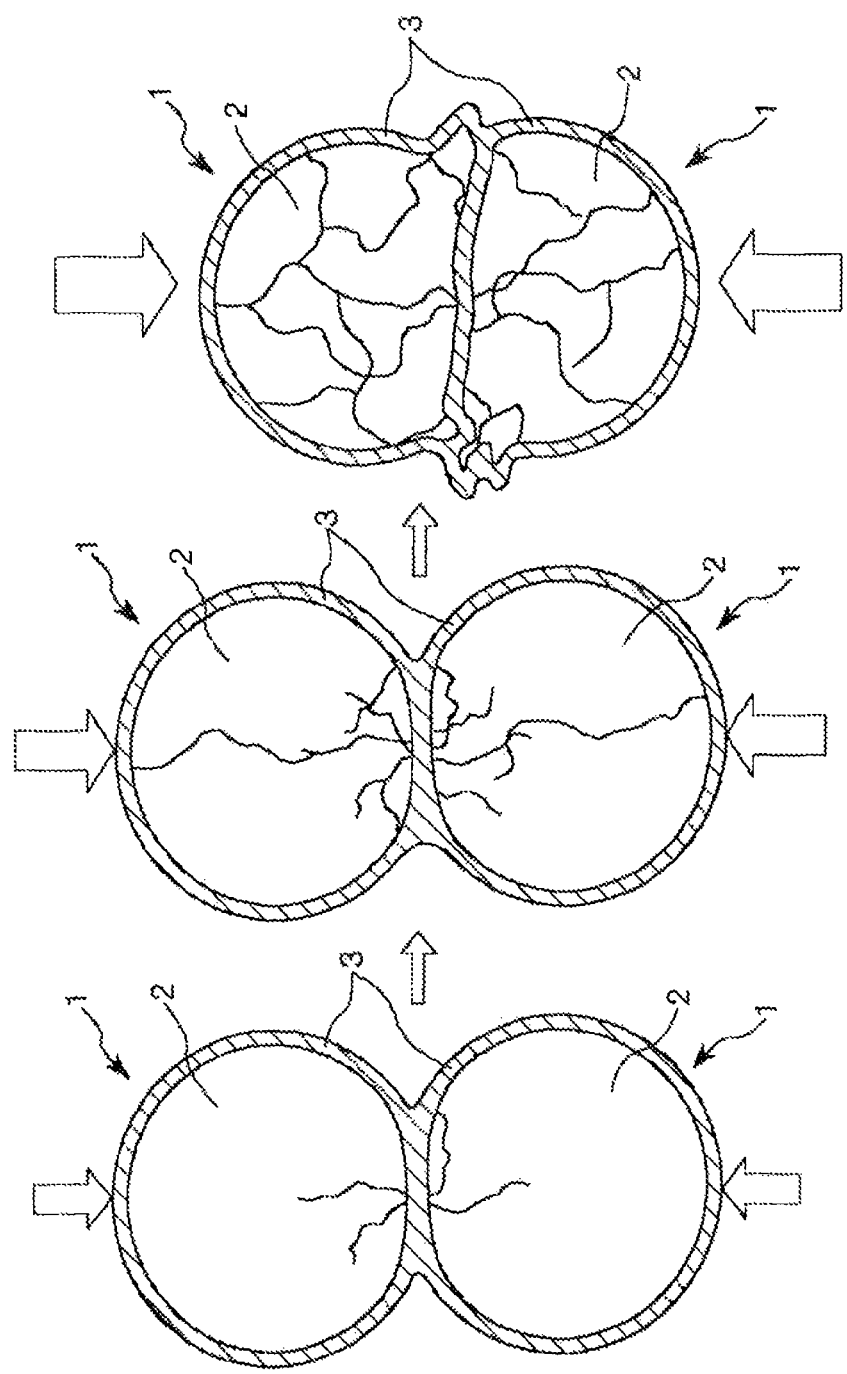
FIG. 2 is a partial cross-sectional view showing a state that pressure is imparted to the coated particles shown in FIG. 1.

FIG. 1 is a partial cross-sectional view showing an embodiment of the coated particles according to the present invention. FIG. 2 is a partial cross-sectional view showing a state that pressure is imparted to the coated particles shown in FIG. 1.

The coated particles of the present invention are packed into fractures formed in a subterranean formation. The coated particles are used for preventing closure of the fractures and keeping conductivity of packed spaces of the subterranean formation (that is, the fractures of the subterranean formation) in which the coated particles are packed. This makes it possible to improve a flowing rate of hydrocarbon contained in the subterranean formation through a wellbore formed so as to penetrate the subterranean formation. As shown in FIG. 1, each coated particle 1 includes a core particle 2 and a surface layer 3 coating at least a part of an outer surface of the core particle 2.

The core particles 2 serve as a propping agent in the fractures when the coated particles 1 are packed into the fractures. As the core particles 2, various kinds of particles having relatively high mechanical strength can be used. The core particles 2 are not limited to a specific kind. Concrete examples of the core particles 2 include sand particles, ceramics particles, silica particles, metal particles and organic particles.

Among the above particles, it is preferred that the core particles 2 include at least one of a sand type particle and a ceramic type particle. Both of the sand type particle and the ceramic type particle have high mechanical strength and can be easily obtained at relatively low cost.

An average particle size of the core particles 2 is preferably in the range of about 100 to 3,000 μm, and more preferably in the range of about 150 to 1,200 μm. By using the core particles 2 having such an average particle size, it is possible to prevent aggregation of the resulting coated particles. Further, it is possible to sufficiently keep the conductivity of the fractures in which the coated particles 1 are packed.

Furthermore, the core particles 2 may have variations in the particle size, and may contain one kind and another kind having about 10 times larger particle size than that of the one kind. Namely, when a size distribution of the core particles 2 is measured, a half width of a peak of a size distribution curve shown as a chevron function may be a relatively large value.

In FIG. 1, a cross-sectional shape of the core particle 2 is depicted as a substantially circular shape, but may be an ellipsoidal shape, a polygonal shape, an irregular shape or the like. In this case, a particle size of the core particle 2 is defined as a maximum length in a cross-sectional shape thereof.

In the case where the ceramics particles are used as the core particles 2, it is preferred that each ceramics particle has a nearly circular shape as possible in the cross-sectional shape thereof. The ceramics particle having such a shape can have especially high mechanical strength. Further, by manufacturing coated particles 1 using such ceramics particles, it is possible to increase sphericity of each of the resulting coated particles 1. As a result, contacts among the coated particles 1 become point contacts when the coated particles 1 are packed into the fracture. This makes it possible to increase volumes of spaces (channels) among the coated particles 1.

Further, natural sand particles may be directly used as the core particles 2. By using such sand particles as the core particles 2, it is possible to improve productivity of the coated particles 1 and save cost thereof. Furthermore, a mixture of the ceramics particles and the sand particles may be used as the core particles 2. In this case, a mixing ratio of the ceramics particles to the sand particles is preferably in the range of about 1:9 to 9:1, and more preferably in the range of about 3:7 to 7:3 in a weight ratio.

At least a part of the outer surface of each core particle 2 is coated with the surface layer 3. Even if the coated particles 1 packed in the fractures of the subterranean formation are collapsed into pieces due to the earth stress, this surface layer 3 can operate to prevent the pieces of each core particle 2 from being scattered (spread) as shown in FIG. 2. This makes it possible to prevent the spaces (channels) among the coated particles 1 from being closed by the pieces of the core particles 2, to thereby more reliably keep the conductivity of the subterranean formation in which the coated particles 1 are packed.

The entire outer surface of each core particle 2 is preferably coated with the surface layer 3. However, the outer surface of each core particle 2 may be partially coated with the surface layer 3, as long as it prevents the pieces of the core particles 2 from being scattered when the coated particles 1 are collapsed into the pieces due to the earth stresses. For the reasons stated above, the surface layer 3 preferably coats about 50 to 100%, more preferably about 70 to 100% of the outer surface of each core particle 2, and even more preferably coats about 90 to 100% of the outer surface of each core particle 2.

Further, an average thickness of the surface layer 3 is not limited to a specific value, but is preferably in the range of about 0.5 to 20 μm, and more preferably in the range of about 1 to 10 μm. By setting the average thickness of the surface layer 3 to be within the above range, it is possible to sufficiently provide a scattering prevention effect of the pieces of the core particles 2 and prevent the sizes of the coated particles 1 from becoming large more than necessary.

The surface layer 3 contains a thermosetting resin and a hydrophilic polymer. By curing the thermosetting resin in the surface layer 3, it is possible to impart high mechanical strength to the surface layer 3. This makes it possible to reliably prevent the pieces of the core particles 2 from being scattered. On the other hand, the hydrophilic polymer can improve compatibility of the coated particles 1 with respect to water (that is, fluid repellent of the coated particles 1 with respect to hydrocarbon).

In this regard, it is required that the thermosetting resin is cured when the coated particles are packed in the fractures of the subterranean formation. Thus, the thermosetting resin may be cured or uncured at the time of packing the coated particles into the fractures. In the case where the uncured thermosetting resin is packed into the fractures, the thermosetting resin is cured by subterranean heat after packing.

Examples of the thermosetting resin include a phenol resin, an epoxy resin, an acryl resin, an urea resin, a furan resin and a xylene-type formaldehyde resin. In this regard, as the thermosetting resin, one of these resins may be used alone, or two or more of these resins may be used in combination. Among them, a thermosetting resin containing the phenol resin is more preferably used. This is because it is possible to impart especially high mechanical strength to the surface layer 3 by curing the phenol resin in the surface layer 3 and the phenol resin has high compatibility with respect to various kinds of hydrophilic polymers.

Examples of the phenol resin include a novolac-type phenol resin, an aralkyl-type phenol resin, a dicyclopentadiene-type phenol resin, a resol-type phenol resin, and a phenol-type furan resin. In this regard, as the phenol resin, one of these resins may be used alone, or two or more of these resins may be used in combination. Among them, the novolac-type phenol resin is preferably used as the phenol resin. This is because the novolac-type phenol resin can be obtained easily and in low cost and has good performance.

As the novolac-type phenol resin, for example, a phenol resin obtained through polycondensation of a phenol-based compound and an aldehyde-based compound under an acidic catalyst is preferably used.

Examples of the phenol-based compound include phenol, o-cresol, m-cresol, p-cresol, xylenol, p-tertiary butyl phenol, p-octyl phenol, p-nonyl phenol, p-cumyl phenol, catechol, resorcin, bisphenol, cashew nut shell liquid (CNSL) and a combination of two or more of the above compounds.

On the other hand, examples of the aldehyde-based compound include formaldehyde, paraformaldehyde, benzaldehyde, acetaldehyde and glyoxal. Further, examples of the acidic catalyst include oxalic acid, sulfuric acid, acetic acid, formic acid, phenol sulfonic acid, p-toluene sulfonic acid, sulfonic acid and phosphonic acid.

Furthermore, examples of the epoxy resin include a biphenyl-type epoxy resin, a bisphenol-type epoxy resin, a stilbene-type epoxy resin, a phenol novolac-type epoxy resin, a cresol novolac-type epoxy resin, a triphenol methane-type epoxy resin, an alkyl-modified triphenol methane-type epoxy resin, a triazine chemical structure-containing epoxy resin, a dicyclopentadiene-modified phenol-type epoxy resin and a phenol aralkyl-type epoxy resin. In this regard, as the epoxy resin, one of these resins may be used alone, or two or more of these resins may be used in combination.

Furthermore, a curing agent for curing the thermosetting resin may be used. In other words, the surface layer 3 may contain the curing agent. The surface layer 3 containing the curing agent can be easily prepared by adding the curing agent into the resin composition to be used for manufacturing the plurality of coated particles 1 to be packed into the fractures of the subterranean formation. The surface layer 3 is not be limited to a specific state such as an uncured state that the thermosetting resin is not yet cured and a cured state that the thermosetting resin is already cured (including a partially-cured state), as long as the surface layer 3 contains the curing agent.

The curing agent is not particularly limited to a specific composition because the curing agent is appropriately selected depending on the kind of the thermosetting resin. In the case where the thermosetting resin is the novolac-type phenol resin, for example, hexamethylenetetramine can be preferably used as the curing agent. In the case where the thermosetting resin is the epoxy resin, for example, amine, imidazole and a novolac-type phenol resin can be used as the curing agent. In the case where the thermosetting resin is the furan resin, an organic acid such as paratoluenesulfonic acid and an inorganic acid can be used as the curing agent.

Further, a curing assistant may be used for adjusting curing speed of the thermosetting resin. However, the present invention is not particularly limited to whether the surface layer 3 contains the curing assistant or not.

An amount of the thermosetting resin contained in the surface layer 3 is preferably in the range of about 70 to 99 wt %, and more preferably in the range of about 85 to 99 wt %. In the case where the amount of the thermosetting resin contained in the surface layer 3 is within the above range, even if the surface layer 3 is formed so as to have a relatively thin thickness, it is possible to impart sufficient mechanical strength to the surface layer 3 due to the curing of the thermosetting resin.

As the hydrophilic polymer, a compound having high compatibility with respect to the thermosetting resin is preferably used. A weight average molecular weight of the hydrophilic polymer is preferably in the range of about 100 to 8,000, and more preferably in the range of about 200 to 6,000. Since a molecular length of the hydrophilic polymer having such a weight average molecular weight becomes long, the hydrophilic polymer is likely to be entwined with a three-dimensional network structure of the cured thermosetting resin. Thus, the hydrophilic polymer having such a weight average molecular weight becomes less likely to be released from the surface layer 3, to thereby more reliably provide the effect thereof.

As the hydrophilic polymer, a compound including from 1 to 20 hydroxyl groups in one molecule is preferably used, and a compound including from 1 to 10 hydroxyl groups in one molecule is more preferably used. By using the hydrophilic polymer including the above number of the hydroxyl groups, it is possible to further improve the conductivity of the packed spaces of the subterranean formation (that is, the fractures of the subterranean formation) in which the coated particles 1 are packed.

Further, examples of the hydrophilic polymer include polyalkylene glycol, poly(meta)acryl amide, polyvinyl alcohol, polyethyleneoxide, a maleic anhydride copolymer, a water-soluble polyamide, starch, cellulose and derivatives thereof. In this regard, as the hydrophilic polymer, one of these compounds may be used alone, or two or more of these compounds may be used in combination.

Among them, the polyalkylene glycol such as polyethylene glycol, polypropylene glycol and polybutylene glycol, trimethylnonyl polyethyleneglycol, polyethyleneglycol monooleate, polyethyleneglycol octadecylether, polyethylene-polyethyleneglycol, or polyethylene-polypropyleneglycol-polyethyleneglycol is more preferably used as the hydrophilic polymer, and the polyethylene glycol is even more preferably used as the hydrophilic polymer. This is because the polyethylene glycol has very high hydrophilicity and high compatibility with respect to the thermosetting resin (especially, the phenol resin).

An amount of the hydrophilic polymer contained in the surface layer 3 is preferably in the range of about 0.001 to 15 wt %, and more preferably in the range of about 0.05 to 6 wt %. By setting the amount of the hydrophilic polymer contained in the surface layer 3 to be within the above range, it is possible to sufficiently improve the conductivity of the packed spaces of the subterranean formation in which the coated particles 1 are packed.

It is preferred that the surface layer 3 further contains a surfactant. By adding the surfactant to the surface layer 3, it is possible to further improve the compatibility between the thermosetting resin and the hydrophilic polymer, to thereby further improve the effect due to the hydrophilic polymer. Further, it is possible to provide an effect of improving compatibility of surfaces of the coated particles 1 with respect to water due to the action of the surfactant itself. These make it possible to further improve the conductivity of the packed spaces of the subterranean formation in which the coated particles 1 are packed.

Examples of the surfactant include a nonionic surfactant, a cationic surfactant and an anionic surfactant. Among them, the nonionic surfactant is preferably used. This is because the nonionic surfactant has very high compatibility with respect to the thermosetting resin and the hydrophilic polymer. Further, this is also because even if the nonionic surfactant is released from the surface layer 3 and then penetrates into the subterranean formation, an impact on the environment is small.

Examples of the nonionic surfactant include a fluoro-type surfactant, an acetylene-type surfactant, an alkylphenol ethoxylate-type surfactant, a primary alcoholic ethoxylate-type surfactant, a secondary alcoholic ethoxylate-type surfactant, an aromatic alcoholic ethoxylate-type surfactant and an aralkyl polyethoxylate-type surfactant. In this regard, as the nonionic surfactant, one of these compounds may be used alone, or two or more of these compounds may be used in combination.

Among them, the nonionic surfactant preferably contains at least one of the fluoro-type surfactant and the acetylene-type surfactant. This is because these surfactants can provide the more superior effect of improving the conductivity of the packed spaces of the subterranean formation in which the coated particles 1 are packed.

As the fluoro-type surfactant, for example, commercial products such as "NOVAC FC-4434", "NOVAC FC-4430" and "NOVAC FC-4432" which are made by Sumitomo 3M Limited, and "Capstone FS-3100" and "Zonyl" which are made by DuPont Inc. can be obtained. Further, as the acetylene-type surfactant, commercial products such as "Surfynol 420", "Surfynol 440", "Surfynol 465" and "Surfynol 104" which are made by Nissin Chemical Industry Co., Ltd. can be obtained.

Further, as the nonionic surfactant, an ether-type surfactant or a fatty acid ester-type surfactant may be used. As the ether-type surfactant, for example, commercial products such as "Emulgen106", "Emulgen147", "Emulgen350", "Emulgen408", "Emulgen LS-106" and "Emulgen A-60" which are made by Kao Corporation can be obtained. As the fatty acid ester-type surfactant, for example, commercial products such as "Rheodol SP-L10", "Rheodol SP-030V", "Rheodol TW-L120" and "Rheodol MS-50" which are made by Kao Corporation can be obtained.

An amount of the surfactant contained in the surface layer 3 is preferably in the range of about 0.001 to 10 wt %, and more preferably in the range of about 0.01 to 5 wt %. By setting the amount of the surfactant contained in the surface layer 3 to be within the above range, even a small amount of the surfactant, it is possible to sufficiently improve the conductivity of the packed spaces of the subterranean formation in which the coated particles 1 are packed.

The surface layer 3 may further contain components other than the above mentioned components. Examples of the other components include a lubricant (wax), a coupling agent and a toughening agent. For example, the lubricant can operate to improve conformability between fluid and the resin (surface layer 3) and the coupling agent can operate to improve adhesiveness between the core particle 2 and the surface layer 3.

Examples of the lubricant include ethylene bisstearic acid amide, methylene bisstearic acid amide, oxystearic acid amide, stearic acid amide, methylol stearic acid amide, hydrocarbon wax and stearic acid. On the other hand, examples of the coupling agent include a silane coupling agent such as an aminosilane type, an epoxysilane type and a vinylsilane type, and a titanate coupling agent.

In FIG. 1, the surface layer 3 is depicted so as to directly contact with the core particle 2. However, at least one layer having an arbitrary function may be provided between the core particle 2 and the surface layer 3. Examples of such a function include a function of improving adhesiveness between the core particle 2 and the surface layer 3.

The coated particles 1 can be manufactured by, for example, preparing a resin composition containing the thermosetting resin, the hydrophilic polymer, the surfactant and the like (that is, a resin composition of the present invention) and then coating at least a part of the outer surface of each core particle 2 with the resin composition. The coating of the outer surface of each core particle 2 can be carried out by kneading the resin composition together with the core particles 2 or applying/spraying the resin composition to the outer surfaces of the core particles 2. Further, the above steps for coating the core particle 2 may be repeatedly carried out multiple times. In this case, constitutions of the resin compositions used in the repeated steps may be identical to or different from every time. In this regard, components contained in the resin composition are the same as mentioned above.

In the resin composition, a weight average molecular weight of the thermosetting resin is preferably in the range of about 200 to 20,000, and more preferably in the range of about 2,000 to 4,000. The resin composition containing the thermosetting resin having the above weight average molecular weight can provide relatively low viscosity. Therefore, it is possible to easily and reliably knead the resin composition and the core particles 2.

Since an amount of the thermosetting resin contained in the resin composition is appropriately set depending on a predetermined amount of the thermosetting resin contained in the surface layer 3, the amount of the thermosetting resin contained in the resin composition is not particularly limited to a specific value, but is preferably in the range of about 70 to 99 wt %, and more preferably in the range of about 85 to 99 wt %.

Further, since an amount of the hydrophilic polymer contained in the resin composition is appropriately set depending on a predetermined amount of the hydrophilic polymer contained in the surface layer 3, the amount of the hydrophilic polymer contained in the resin composition is not particularly limited to a specific value, but is preferably in the range of about 0.001 to 15 wt %, and more preferably in the range of about 0.05 to 6 wt %.

Furthermore, in the case where the resin composition contains the surfactant, an amount of the surfactant contained in the resin composition is appropriately set depending on a predetermined amount of the surfactant contained in the surface layer 3. Thus, the amount of the surfactant contained in the resin composition is not particularly limited to a specific value, but is preferably in the range of about 0.001 to 10 wt %, and more preferably in the range of about 0.01 to 5 wt %.

In this regard, by respectively setting the amounts of the thermosetting resin, the hydrophilic polymer and the surfactant contained in the resin composition to be within the above ranges, it is possible to prevent the viscosity of the resin composition from becoming high. As a result, it is possible to easily handle the resin composition.

The resin composition may contain solution capable of dissolving or dispersing the above mentioned components. This makes it possible to easily adjust the viscosity of the resin composition. In the case where the resin composition contains the solution, it is preferred that the solution is removed from the resin composition by air drying or the like after at least a part of the outer surface of each core particles 2 is coated with the resin composition. This makes it possible to prevent the resin composition (surface layer 3) from being released from the core particle 2 and uniform the thickness of the surface layer 3.

Examples of such solution include water; an alcohol-based solution such as methanol, ethanol and propanol; a ketone-based solution such as acetone and methyl ethyl ketone; and an ester-based solution such as methyl acetate and ethyl acetate. In this regard, as the solution, one of these compounds may be used alone, or two or more of these compounds may be used in combination.

For packing the above mentioned coated particles 1 into the fractures formed in the subterranean formation, an injection material is prepared by dispersing the coated particles 1 into fluid for transferring them to the fractures. The injection material is transferred into the fractures formed in the subterranean formation through the wellbore penetrating the subterranean formation.

The fluid to be used for preparing the injection material is preferably the same as the fluid used for forming the fractures in the subterranean formation. In particular, high viscosity solution such as 2% KCl aqueous solution is typically used for fractures. Viscosity at 25° C. of the fluid is preferably in the range of about 10 to 500 mPa·s, more preferably in the range of about 15 to 300 mPa·s, and more preferably in the range of about 20 to 100 mPa·s. By using the fluid having the above viscosity, it is possible to reliably form the fractures in the subterranean formation. Further, it is possible to improve dispersibility of the coated particles 1 in the injection material, to thereby efficiently transfer and pack the coated particles 1 into the fractures.

The fluid is mainly composed of water, and preferably contains at least one compound of a solvent, a viscosity modifier, a surfactant, a breaker, a viscosity stabilizer, a gelatinizing agent and a stabilizing agent. By using the above compound, it is possible to easily and reliably adjust the viscosity of the fluid to be within the above range. In this regard, the "breaker" can break the cross-links of the gel.

An amount of the coated particles 1 contained in the injection material is preferably in the range of about 1 to 99 wt %, and more preferably in the range of about 5 to 90 wt %. The injection material containing the above amount of the coated particles 1 can stably disperse the coated particles 1 regardless of the viscosity of the fluid.

Next, description will be given to a method for recovering the hydrocarbon (shale gas and/or shale oil) from the subterranean formation.

Figure 3:
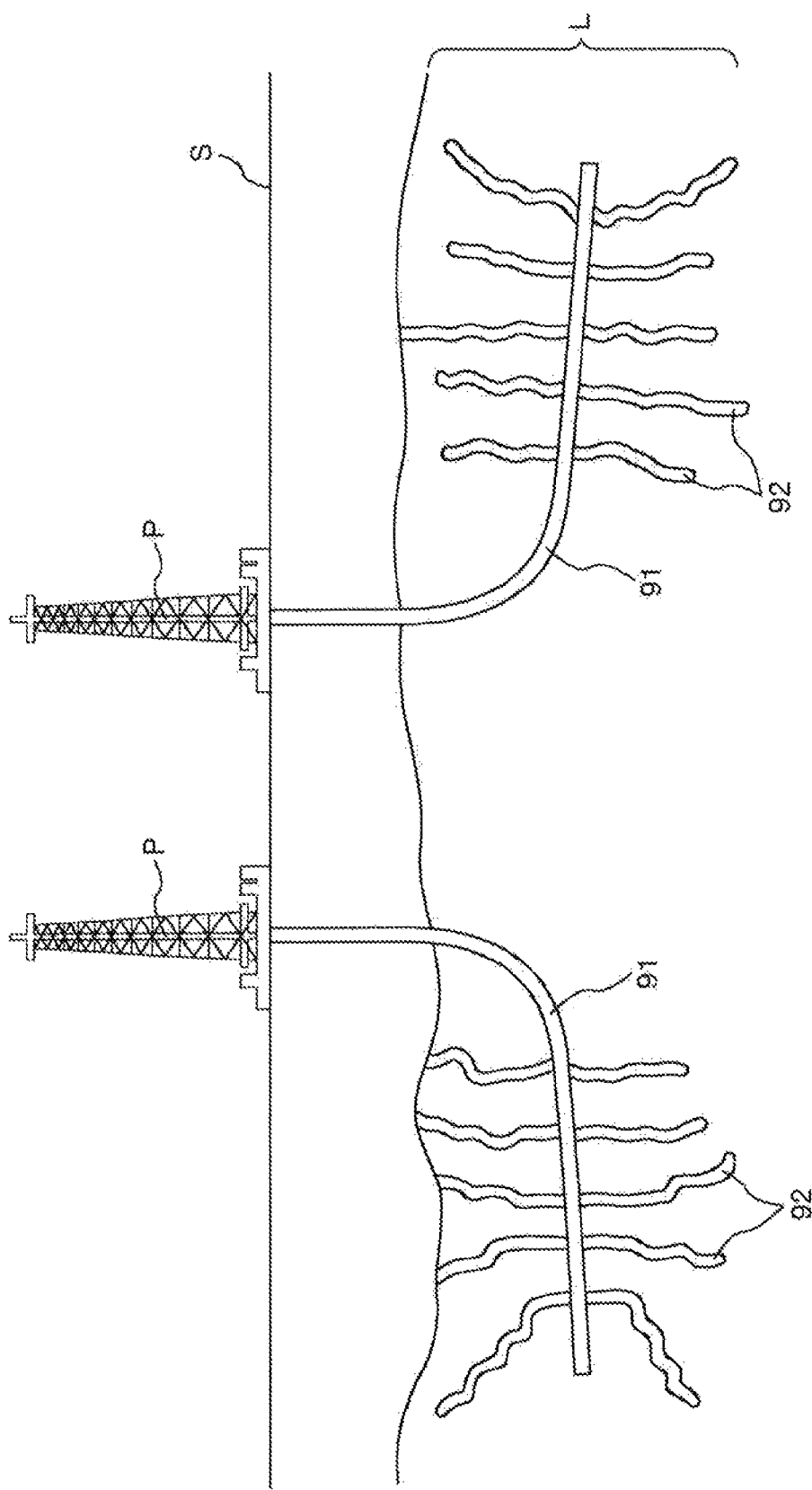
FIG. 3 is a conceptual view for explaining a method for recovering hydrocarbon from a subterranean formation.

FIG. 3 is a conceptual view for explaining the method for recovering the hydrocarbon from the subterranean formation.

[1] First, as shown in FIG. 3, a wellbore 91 is dug from a land surface S to a desirable (objective) subterranean formation L containing the hydrocarbon in a vertical direction. After the wellbore 91 reaches the subterranean formation L, the digging direction thereof is changed to a horizontal direction and then the wellbore 91 is dug in the subterranean formation L until the wellbore 91 forwards a predetermined distance in the horizontal direction.

[2] Next, fluid is injected into the subterranean formation L through the wellbore 91 at a predetermined rate and pressure. At this time, the fluid gradually breaks down soft parts of the subterranean formation L. In this way, a plurality of fractures 92 are formed in the subterranean formation L so as to be communicated with the wellbore 91 and radially positioned around an axis thereof.

[3] Next, an injection material is injected into the subterranean formation L through the wellbore 91 at a predetermined rate and pressure instead of the fluid. At this time, the injection material is injected into each fracture 92 together with the coated particles 1. Namely, this step [3] corresponds to a method for injecting the injection material into the fracture 92 according to the present invention.

In this regard, it is preferred that this step [3] is carried out with gradually increasing an amount of the coated particles 1 contained in the injection material. This makes it possible to reliably pack the coated particles 1 into each fracture 92 at high density.

By packing the coated particles 1 into each fracture 92 in such a way, it is possible to prevent each fracture 92 from being closed due to the earth stress. According to the present invention, in particular, since the surface layers 3 of the coated particles 1 contain the hydrophilic polymer, it is possible to keep conductivity of each fracture 92 in which the coated particles 1 are packed. Therefore, a flowing rate of the hydrocarbon from the subterranean formation L through the wellbore 91 can remarkably increase, to thereby improve an amount of the hydrocarbon recovered from the subterranean formation L.

[4] Next, the hydrocarbon is recovered through each fracture 92 and the wellbore 91 from the subterranean formation L using a pump P provided on the land surface S.

Figure 4:
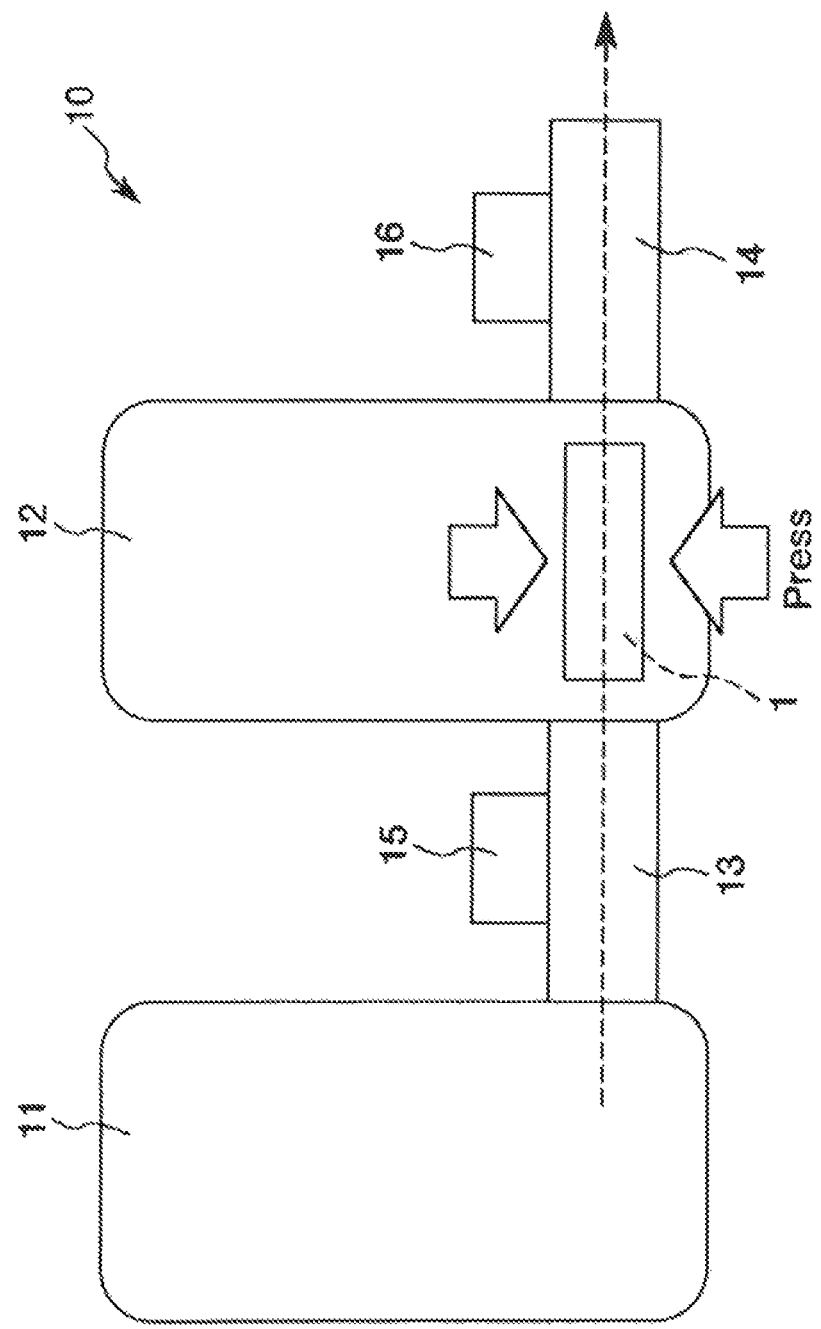
FIG. 4 is a view for explaining a method for measuring conductivity.

The conductivity due to the coated particles 1 can be measured by the following method explained in the following examples. Alternatively, the conductivity can be also measured based on measurement values obtained with measurement equipment shown in FIG. 4. FIG. 4 is a view for explaining a method for measuring conductivity.

The measurement equipment 10 includes a pump 11 capable of sending liquid, a press machine 12 capable of receiving the coated particles and pressing the coated particles received therein, a pipe 13 connecting with the pump 11 and the press machine 12, and a pipe 14 connected with the press machine 12 at an opposite side to the pump 11. Further, pressure sensors 15 and 16 capable of measuring pressure of the liquid passing through inside thereof are respectively provided on the pipes 13 and 14.

In the measurement equipment 10, the liquid is transferred from the pump 11 to the press machine 12 through the pipe 13, and then the liquid flowing into the press machine 12 is wasted through the pipe 14. At this time, pressures of the liquid flowing through an inside of the pipes 13 and 14 are respectively measured by the pressure sensors 15, 16, and then a pressure difference therebetween is obtained. This pressure difference is defined as conductivity of the inside of the press machine 12 (that is, a packed portion of the coated particles 1).

At the time of measuring the conductivity actually, 2% KCl aqueous solution is used as the liquid and it is preferred that the pressure of the liquid transferred from the pump 11 is set to be 10 Kpsi.

While the resin composition, the coated particles, the injection material and the method for injecting the injection material into the fracture according to the present invention have been described hereinabove, the present invention is not limited thereto.

EXAMPLES

Hereinafter, more detailed description will be given to the present invention with reference to examples thereof.

1. Manufacture of Coated Particles

Example 1

1,000 parts by weight of phenol, 10 parts by weight of oxalic acid and 603 parts by weight of 370 formalin were put into a reaction container having a cooler and a stirrer. Next, they were reacted with each other at a temperature of 95 to 100° C. for 4 hours with heating and stirring, to thereby obtain a reactant. Next, the reactant was dehydrated by being heated up to 140° C. under atmospheric pressure. Thereafter, the phenol was removed from the reactant under reduced pressure until a softening point of the reagent became 90° C. In this way, 926 parts by weight of a novolac-type phenol resin having a weight average molecular weight of 3,000 was obtained.

0.5 parts by weight of polyethylene glycol having a weight average molecular weight of 400 as a hydrophilic polymer and 3.0 parts by weight of aminosilane as a silane coupling agent were added to 100 parts by weight of the obtained novolac-type phenol resin, to thereby obtain 103.5 parts by weight of a resin composition (mixture).

Next, as core particles, frac sand (sand particles) having an average particle size of 400 μm was prepared. 100 parts by weight of the frac sand was heated at 160° C. and put into a mixer, and then 3 parts by weight of the above obtained resin composition was added thereto and kneaded for 120 seconds, to thereby obtain a kneaded product. Next, hexamethylene tetramine aqueous solution prepared by dissolving 2.25 parts by weight of hexamethylene tetramine into 5.25 parts by weight of water was added to the kneaded product and then they were kneaded for 300 seconds, to thereby obtain coated particles.

In this regard, it was confirmed that an entire outer surface (100%) of each particle of the frac sand is coated with a surface layer. A condition of the outer surface of the coated particle was confirmed with an optical microscope.

Examples 2 to 30 and Comparative Example

Coated particles of each of examples 2 to 30 and a comparative example were obtained in the same manner as example 1, except that resin compositions prepared according to compositions shown in Table 1. In this regard, the coated particles of each of examples 2 to and the comparative example were observed in the same manner as example 1. As a result, it was confirmed that an entire outer surface (100%) of each coated particle of frac sand is coated with a surface layer.

2. Evaluation 2-1. Crush Test

Crush tests were carried out according to the following steps. First, 40 g of the coated particles obtained in each of the examples and the comparative example were respectively put into a crush test cell for crushing sand (made by Okuyama mold factory limited private company). Next, pressure in the cell was raised for one minute and then kept for two minutes at pressure of 14,000 psi.

2-2. Conductivity

Conductivity was evaluated based on permeability obtained in a permeability test according to the following steps.

First, a stainless cylindrical container (having a diameter of 60 mm and a height of 210 mm) having a bottom part connected with a tube (having a diameter of mm) having a cock was prepared and then #100 metallic mesh was provided in the cylindrical container. Next, 200 g of the coated particles obtained in each of the examples and the comparative example were respectively put (filled) into the cylindrical container.

Next, 200 g of 2% KCl aqueous solution was supplied into the cylindrical container. After that, the cock of the tube was opened to discharge the KCL aqueous solution from the cylindrical container. This discharged KCL aqueous solution was recovered on a minute-by-minute basis (every minute). This recovering of the KCL aqueous solution was continually carried out until 900 of the KCL aqueous solution supplied into the cylindrical container was discharged. After that, weights of the KCL aqueous solutions recovered in each phase were measured and an average of measured values was taken. All of the steps for the permeability test were carried out at room temperature. By using the average of the measured values as an index value for conductivity, the conductivity was evaluated.

These evaluating results are indicated in Table 1. Abbreviations in Table 1 are as follows.

PEG200: Polyethylene glycol having a weight average molecular weight of 200
PEG400: Polyethylene glycol having a weight average molecular weight of 400
PEG1500: Polyethylene glycol having a weight average molecular weight of 1,500
PEG1540: Polyethylene glycol having a weight average molecular weight of 1,540
PEG6000J: Polyethylene glycol having a weight average molecular weight of 6,000
FC-4434: Fluoro-type surfactant ("NOVAC FC-4434" made by Sumitomo 3M limited)
FC-4430: Fluoro-type surfactant ("NOVAC FC-4430" made by Sumitomo 3M limited)
FC-4432: Fluoro-type surfactant ("NOVAC FC-4432" made by Sumitomo 3M limited)
Capstone: Fluoro-type surfactant ("Capstone FS-3100" made by DuPont Inc.)
Zonyl: Fluoro-type surfactant ("Zonyl" made by DuPont Inc.)
Surfynol420: Acetylene-type surfactant ("Surfynol 420" made by Nissin Chemical Industry Co., Ltd)
Surfynol440: Acetylene-type surfactant ("Surfynol 440" made by Nissin Chemical Industry Co., Ltd)
Surfynol465: Acetylene-type surfactant ("Surfynol 465" made by Nissin Chemical Industry Co., Ltd)
Surfynol104: Acetylene-type surfactant ("Surfynol 104" made by Nissin Chemical Industry Co., Ltd)
Emulgen106: Ether-type surfactant ("Emulgen106" made by Kao Corporation: polyoxyethylene lauryl ether)
Emulgen147: Ether-type surfactant ("Emulgen147" made by Kao Corporation: polyoxyethylene lauryl ether)
Emulgen350: Ether-type surfactant ("Emulgen350" made by Kao Corporation: polyoxyethylene stearyl ether)
Emulgen408: Ether-type surfactant ("Emulgen408" made by Kao Corporation: polyoxyethylene oleyl ether)
Emulgen A-60: Ether-type surfactant ("Emulgen A-60" made by Kao Corporation: polyoxyethylene distyrene phenyl ether)
Emulgen LS-106: Ether-type surfactant ("Emulgen LS-106" made by Kao Corporation: polyoxyalkylene aklyl ether)
Rheodol SP-L10: Fatty acid ester-type surfactant ("Rheodol SP-L10" made by Kao Corporation: sorbitan monolaurate)
Rheodol SP-030V: Fatty acid ester-type surfactant ("Rheodol SP-030V" made by Kao Corporation: sorbitan trioleate)
Rheodol TW-L120: Fatty acid ester-type surfactant ("Rheodol TW-L120" made by Kao Corporation: polyoxyethylene sorbitan monolaurate)
Rheodol MS-50: Fatty acid ester-type surfactant ("Rheodol MS-50" made by Kao Corporation: glycerol monostearate)

TABLE 1

| | Resin composition | | | | | | | | Evaluation | |
| | Thermosetting resin | Hydrophilic polymer | | Surfactant | | Surface layer | | | | |
| | | | | | | Thermosetting resin | Hydrophilic polymer | Surfactant | | Crush Test | |
| | Contained amount [parts by weight] | Type | Contained amount [parts by weight] | Type | Contained amount [parts by weight] | Contained amount [parts by weight] | Contained amount [parts by weight] | Contained amount [parts by weight] | Average thickness [μm] | (amount of dust) [%] | Conductivity [g/min] |
|---|---|---|---|---|---|---|---|---|---|---|---|
| Ex. 1 | 100 | PEG400 | 0.5 | — | 0 | 100 | 0.5 | 0 | 10 | 21 | 44 |
| Ex. 2 | 100 | PEG400 | 2.0 | — | 0 | 100 | 2.0 | 0 | 10 | 20 | 48 |
| Ex. 3 | 100 | PEG400 | 0.5 | FC-4434 | 0.2 | 100 | 0.5 | 0.2 | 10 | 19 | 51 |
| Ex. 4 | 100 | PEG400 | 0.5 | Sulfynol420 | 0.2 | 100 | 0.5 | 0.2 | 10 | 19 | 51 |
| | | | | Capstone | 0.03 | | | 0.03 | | | |
| Ex. 5 | 100 | PEG200 | 1.0 | — | 0 | 100 | 1.0 | 0 | 10 | 21 | 38 |
| Ex. 6 | 100 | PEG400 | 1.0 | — | 0 | 100 | 1.0 | 0 | 10 | 18 | 43 |
| Ex. 7 | 100 | PEG1500 | 1.0 | — | 0 | 100 | 1.0 | 0 | 10 | 20 | 42 |
| Ex. 8 | 100 | PEG1540 | 1.0 | — | 0 | 100 | 1.0 | 0 | 10 | 20 | 41 |
| Ex. 9 | 100 | PEG6000J | 1.0 | — | 0 | 100 | 1.0 | 0 | 10 | 16 | 43 |
| Ex. 10 | 100 | PEG400 | 1.0 | FC-4430 | 0.2 | 100 | 0.5 | 0.2 | 10 | 21 | 47 |
| Ex. 11 | 100 | PEG400 | 1.0 | FC-4432 | 0.2 | 100 | 2.0 | 0.2 | 10 | 20 | 46 |
| Ex. 12 | 100 | PEG400 | 1.0 | FC-4434 | 0.2 | 100 | 0.5 | 0.2 | 10 | 19 | 48 |
| Ex. 13 | 100 | PEG400 | 1.0 | Surfynol420 | 0.2 | 100 | 0.5 | 0.2 | 10 | 20 | 51 |
| Ex. 14 | 100 | PEG400 | 1.0 | Capstone | 0.05 | 100 | 0.5 | 0.2 | 10 | 20 | 48 |
| Ex. 15 | 100 | PEG400 | 1.0 | Capstone | 0.2 | 100 | 0.5 | 0.2 | 10 | 20 | 50 |

TABLE 1-continued

| | Resin composition | | | | | Surface layer | | | | Evaluation | |
|---|---|---|---|---|---|---|---|---|---|---|---|
| | Thermosetting resin | Hydrophilic polymer | | Surfactant | | Thermosetting resin | Hydrophilic polymer | Surfactant | | Crush | |
| | Contained amount [parts by weight] | Type | Contained amount [parts by weight] | Type | Contained amount [parts by weight] | Contained amount [parts by weight] | Contained amount [parts by weight] | Contained amount [parts by weight] | Average thickness [μm] | Test (amount of dust) [%] | Conductivity [g/min] |
| Ex. 16 | 100 | PEG200 | 1.0 | Zonyl | 0.2 | 100 | 1.0 | 0 | 10 | 19 | 48 |
| Ex. 17 | 100 | PEG400 | 1.0 | Surfynol420 | 0.2 | 100 | 1.0 | 0 | 10 | 20 | 49 |
| Ex. 18 | 100 | PEG400 | 1.0 | Surfynol440 | 0.2 | 100 | 1.0 | 0 | 10 | 20 | 49 |
| Ex. 19 | 100 | PEG400 | 1.0 | Surfynol465 | 0.2 | 100 | 1.0 | 0 | 10 | 19 | 46 |
| Ex. 20 | 100 | PEG400 | 1.0 | Surfynol104 | 0.2 | 100 | 1.0 | 0 | 10 | 20 | 47 |
| Ex. 21 | 100 | PEG400 | 1.0 | Emulgen106 | 0.2 | 100 | 1.0 | 0.2 | 10 | 20 | 48 |
| Ex. 22 | 100 | PEG400 | 1.0 | Emulgen147 | 0.2 | 100 | 1.0 | 0.2 | 10 | 21 | 47 |
| Ex. 23 | 100 | PEG400 | 1.0 | Emulgen350 | 0.2 | 100 | 1.0 | 0.2 | 10 | 22 | 49 |
| Ex. 24 | 100 | PEG400 | 1.0 | Emulgen408 | 0.2 | 100 | 1.0 | 0.2 | 10 | 20 | 46 |
| Ex. 25 | 100 | PEG400 | 1.0 | Emulgen LS-106 | 0.2 | 100 | 1.0 | 0.2 | 10 | 22 | 48 |
| Ex. 26 | 100 | PEG200 | 1.0 | Emulgen A-60 | 0.2 | 100 | 1.0 | 0.2 | 10 | 19 | 43 |
| Ex. 27 | 100 | PEG400 | 1.0 | Rheodol SP-L10 | 0.2 | 100 | 1.0 | 0.2 | 10 | 19 | 43 |
| Ex. 28 | 100 | PEG1500 | 1.0 | Rheodol SP-O30V | 0.2 | 100 | 1.0 | 0.2 | 10 | 20 | 46 |
| Ex. 29 | 100 | PEG1540 | 1.0 | Rheodol TW-L120 | 0.2 | 100 | 1.0 | 0.2 | 10 | 20 | 45 |
| Ex. 30 | 100 | PEG6000J | 1.0 | Rheodol MS-50 | 0.2 | 100 | 1.0 | 0.2 | 10 | 21 | 45 |
| Cf | 100 | — | 0 | — | 0 | 100 | 0 | 0 | 10 | 21 | 29 |

As shown in Table 1, in the coated particles obtained in each of the examples and the comparative example, the amounts of dust (pieces) emergence are not significantly different from each other. On the other hand, the coated particles obtained in each of the examples obviously indicate high conductivity as compared with the coated particles obtained in the comparative example. In particular, by using the hydrophilic polymer and the surfactant in combination, the conductivity tends to more increase.

What is claimed is:

1. A resin composition when used for forming a surface layer coating at least a part of an outer surface of a particle, the particle adapted to be packed into a fracture formed in a subterranean formation, the resin composition comprising:
   a novolac phenolic resin;
   hexamethylenetetramine;
   a hydrophilic polymer; and
   wherein an amount of the novolac phenolic resin contained in the resin composition is in the range of 70 to 99 wt %;
   a nonionic surfactant in an amount in the range of 0.001 to 0.2 wt %;
   wherein the nonionic surfactant is an acetylene-type surfactant;
   wherein a weight average molecular weight of the hydrophilic polymer is in the range of 100 to 8,000;
   wherein the hydrophilic polymer includes 1 to 10 of hydroxyl groups in one molecule thereof; and
   wherein an amount of the hydrophilic polymer contained in the resin composition is in the range of 0.001 to 15 wt %.

2. The resin composition as claimed in claim 1, wherein the hydrophilic polymer contains polyalkylene glycol.

3. Coated particles adapted to be packed into a fracture formed in a subterranean formation, each coated particle comprising:
   a core particle having an outer surface; and
   a surface layer coating at least a part of the outer surface of the core particle,
   wherein the surface layer contains a novolac phenolic resin, hexamethylenetetramine and a hydrophilic polymer;
   wherein an amount of the novolac phenolic resin contained in the surface layer is in the range of 70 to 99 wt %;
   wherein the surface layer further contains a nonionic surfactant in an amount in the range of 0.001 to 0.2 wt %;
   wherein the nonionic surfactant is an acetylene-type surfactant, wherein a weight average molecular weight of the hydrophilic polymer is in the range of 100 to 8,000;
   wherein the hydrophilic polymer includes 1 to 10 of hydroxyl groups in one molecule thereof; and
   wherein an amount of the hydrophilic polymer contained in the surface layer is in the range of 0.001 to 15 wt %.

4. The coated particles as claimed in claim 3, wherein the hydrophilic polymer contains polyalkylene glycol.

5. The coated particles as claimed in claim 3, wherein the surface layer contains the surfactant in the amount in the range of 0.03 to 0.2 wt %.

6. The coated particles as claimed in claim 3, wherein the surface layer consists essentially of the novolac phenolic resin, hexamethylenetetramine, the hydrophilic polymer and the nonionic surfactant and wherein the novolac phenolic resin forms a thermosetting resin, which is in a cured state or in an uncured state.

7. The coated particles as claimed in claim 3, wherein an average thickness of the surface layer is in the range of 0.5 to 20 μm.

8. The coated particles as claimed in claim 3, wherein the surface layer coats 50 to 100% of the outer surface of the core particle.

9. The coated particles as claimed in claim 3, wherein the core particles contain at least one kind of sand particles and ceramics particles.

10. The coated particles as claimed in claim 3, wherein an average particle size of the core particles is in the range of 100 to 3,000 μm.

11. The coated particles as claimed in claim 3, wherein the novolac phenolic resin forms a thermosetting resin, which is in a cured state or in an uncured state.

12. An injection material adapted to be injected into a fracture formed in a subterranean formation, the injection material comprising:
 the coated particles defined by claim 3; and
 a fluid into which the coated particles are dispersed, the fluid for transferring the coated particles to the fracture; and
 wherein an amount of the coated particles contained in the injection material is in the range of 1 to 99 wt %.

13. The injection material as claimed in claim 12, wherein the fluid contains at least one of a solvent, a viscosity modifier, a surface acting agent, a breaker, a viscosity stabilizer, a gelling agent and a stabilizer.

\* \* \* \* \*